March 22, 1949.                I. E. COFFEY                2,464,847
                         WINDSHIELD WIPER CONTROL
Filed March 30, 1944                                    2 Sheets-Sheet 1
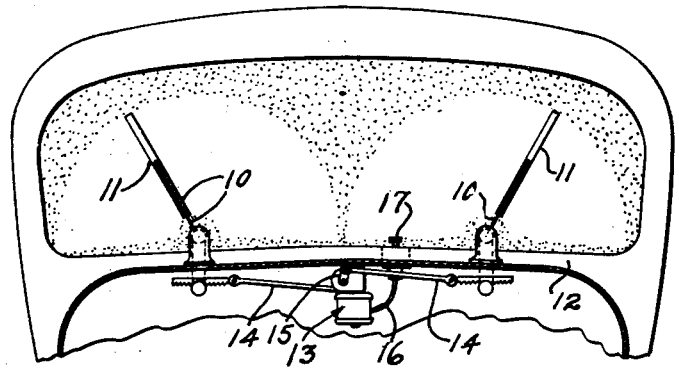
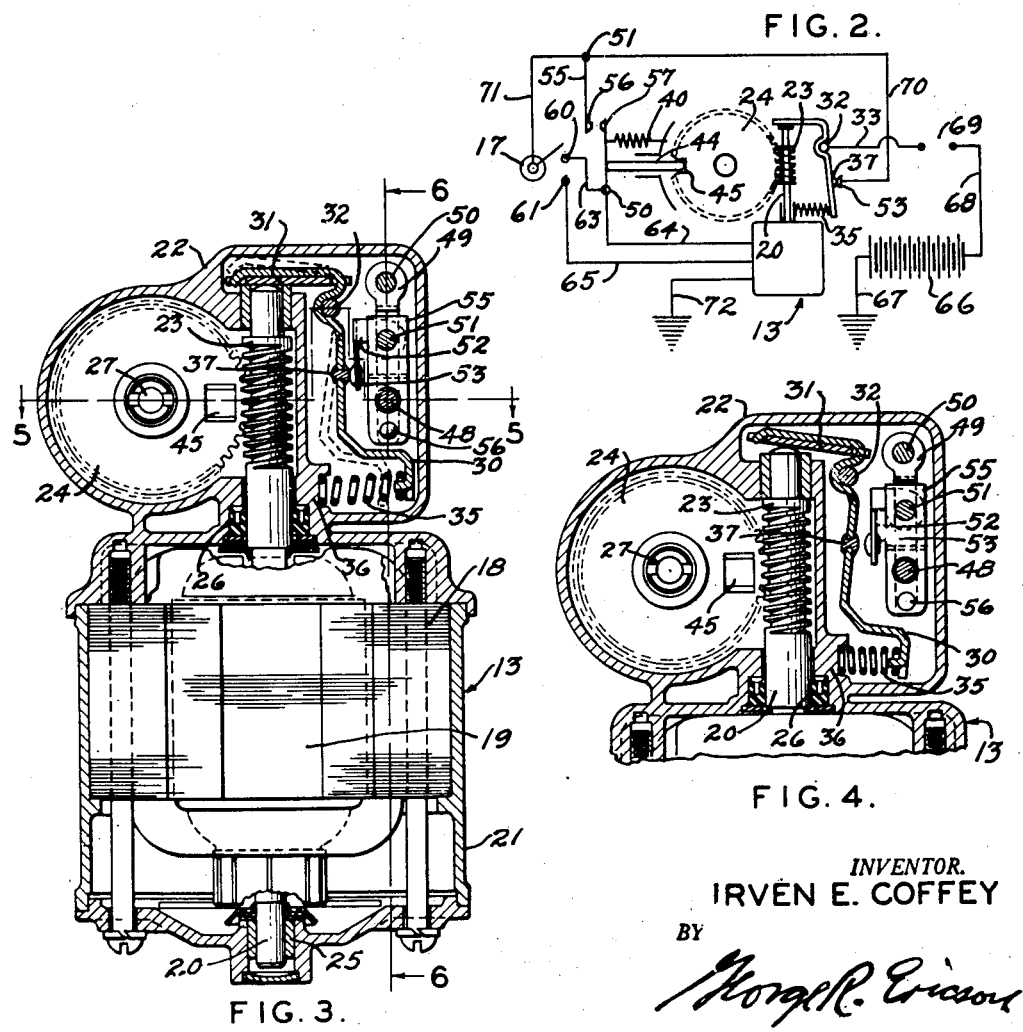
INVENTOR.
IRVEN E. COFFEY
BY March 22, 1949.  I. E. COFFEY  2,464,847
WINDSHIELD WIPER CONTROL Filed March 30, 1944  2 Sheets-Sheet 2

*INVENTOR.*
IRVEN E. COFFEY
BY
*George R. Ericson*

Patented Mar. 22, 1949

2,464,847

UNITED STATES PATENT OFFICE 2,464,847

WINDSHIELD WIPER CONTROL

Irven E. Coffey, Normandy, Mo.

Application March 30, 1944, Serial No. 528,798

6 Claims. (Cl. 318—468)

This invention relates to windshield wiper driving and controlling devices.

An electric windshield wiper drive has the advantage over the more common suction operated type in that the speed of the wiper blades is independent of the speed of the engine and suction in the intake manifold. However, there is a disadvantage in that the motor may become overheated and damaged if the blades should become blocked because of freezing or for any other reason.

Accordingly, it is an object of the present invention to provide means insuring the cutting off of the power supply to the motor in case of an overload.

It is another object to provide a novel parking arrangement which can be easily operated by a button convenient to the operator to park the blades outside of his range of vision.

Another object is to provide the simple and rugged windshield wiper motor and control.

These objects and other more detailed objects hereafter appearing are attained substantially by the device illustrated in the accompanying drawings in which Fig. 1 is a front view of an automobile body and windshield having a pair of wipers and the novel motor and control applied thereto.

Fig. 2 is a diagrammatic view of the parts and wiring arrangement used with the novel control and motor.

Fig. 3 is a section taken substantially on line 3—3 of Fig. 5.

Fig. 4 is a view of a part of the structure in Fig. 3, but showing the overload switch in its opened position.

Figure 5:
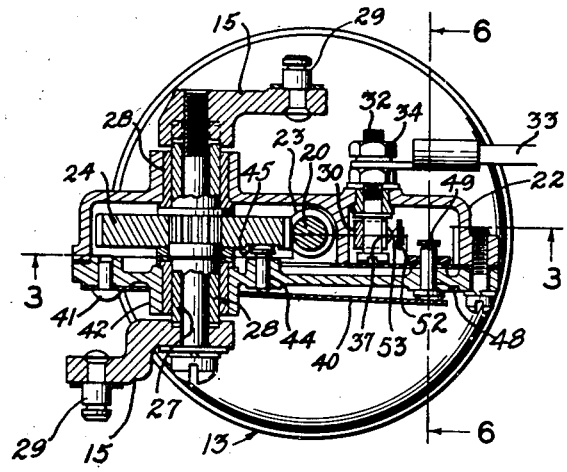
Fig. 5 is a sectional view taken substantially on line 5—5 of Fig. 3.

Fig. 1 shows a pair of wiper arms 10 and blades 11 mounted on the cowl portion 12 of an automobile and connected to an electric motor 13, mounted beneath the cowl, by transmission means including links 14 and arms 15. The wiring for the motor is conducted in a cable 16 to the wiper control button 17, located conveniently for the driver, and a source of current such as the ignition switch.

The motor may be of any suitable type including field laminations and coils 18 and an armature 19 mounted on shaft 20. These parts are enclosed within a casing 21 and a second, flattened casing or housing 22 projecting thereabove. Motor shaft 20 extends into housing 22 and rigidly carries a worm 23 in meshing engagement with a worm gear 24. Shaft 20 is journalled in suitable bearings 25 and 26 in the end walls of casing 21. Form gear 24 is rigidly carried on a shaft 27 journalled in the side walls of casing 22 in suitable bearing bushings, as at 28. Arms 15 are rigidly attached to the extremities of shaft 27 and have pins 29 for attachment to links 14. Thus, worm 23, worm gear 24, arms 15, and links 14 comprise the transmission mechanism connecting the motor to the wiper arms.

Motor armature 19 is capable of slight axial movement within its casing 21 together with shaft 20 and worm 23. Under normal conditions, however, the armature is resiliently maintained in its lowermost position, in which the worm and gear are in properly centered, meshing relationship, by an angular lever 30 having one end provided with a pad 31 which bears against the extremity of motor shaft 20. Intermediately, this lever is pivoted on a stud 32 (Figs. 3 and 5) mounted in, but insulated from, one wall of casing 22 and having a threaded end forming a terminal for attachment of an electrical wire 33 held in place by a nut 34. A coiled spring 35 is compressed between the opposite end of lever 30 and motor shaft bearing boss 36 so as to constantly urge the lever counterclockwise and maintain the worm and motor armature in their normal operating positions. A switch contact 37, to be further described hereafter, is mounted in lever 30.

Figure 7:
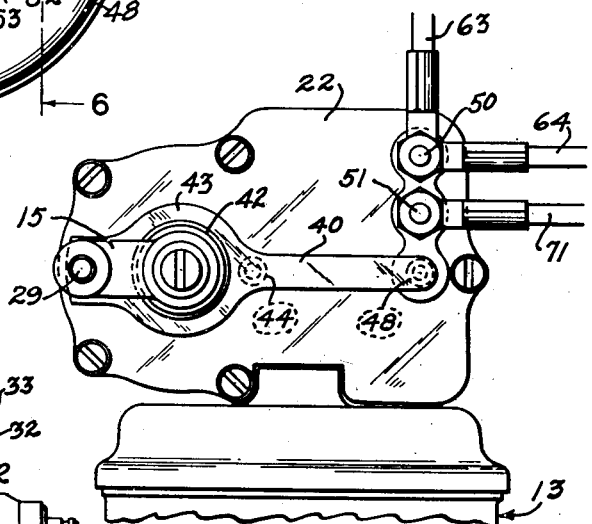
Fig. 7 is a side view of the control housing.

A spring strip 40 is mounted on the outside of one wall of casing 22 (Figs. 5 and 7) by a rivet 41. This strip is looped about bearing boss 42, as at 43. A pin 44, longitudinally slidable in the casing wall, at one end engages strip 40 and at the other bears against the adjacent face of worm gear 24. This gear has a recess 45 (Figs. 3 and 5), at the same radial distance from shaft 27 as is pin 44, so that once in each cycle of the gear this pin drops into the recess.

Figure 6:
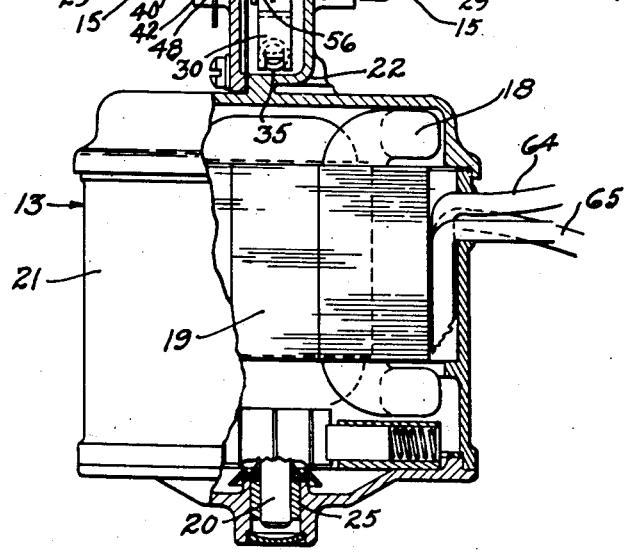
Fig. 6 is a section taken substantially on line 6—6 of Fig. 3.

A second pin 48 is also longitudinally slidable in the wall of casing 22 in radial alignment with pin 44. Pin 48, at one end, rests against the extremity of spring strip 40 and, at its other, engages the free end of a second spring strip 49 inside the casing. As best shown in Fig. 6, this strip is attached at its opposite end to the casing wall by a binding post 50 and has a central, outset portion, beneath which there is located a second binding post 51. An angular metal strip 52 is secured at one end on binding post 51 and, at its free end carries a switch contact 53 for cooperating with previously mentioned contact 37 on lever 30. This is a normally closed switch. Also, secured in position by binding post 51, is a connector strip 55 (Fig. 6) which has an opening receiving pin 48 and, at its lower extremity, carries a switch contact 56 in operative association with a switch contact 57 at the lower extremity of spring strip 49 secured on binding post 50. Contacts 37 and 53 comprise the overload switch and contacts 56 and 57 form the parking switch.

From the wiring diagram in Fig. 2 it will be seen that parking button 17 operates a switch controller in connection with a pair of contacts 60 and 61, the former being connected to the motor through lead 63, terminal 50, and lead 64, and contact 61 being connected directly to the motor by a lead 65. The usual storage battery is shown at 66 and has its negative pole grounded by the lead 67 and its positive pole connected by a lead 68 to the ignition switch 69 and thence to terminal 32 forming part of the overload switch. Contact 53 thereof, is connected by a lead 70 (angular strip 52 in Fig. 6) to terminal 51 and thence to contact 56 of the parking switch via connecting strip 55. A lead 71 also connects terminal 51 to the movable contact of the parking switch. Lead 63, 64 connects with the low speed winding of the motor, whereas lead 65 from contact 61 of the parking switch connects with the high speed winding of the motor. The motor is grounded by a lead 72. The operation is as follows:

When the parking button is rotated from the open position, shown in Fig. 2, to engage either of the contacts 60 or 61, current is directed from the battery through the overload switch and leads 70 and 71 to either the high speed connection 65 or the low speed connection 63. The motor then operates normally to oscillate the blades back and forth across the windshield. In case the wiper arms or any part of the transmission should be blocked, as by accumulated snow on the glass, worm 33 will travel upwardly with relation to worm gear 24, rotating lever 30 clockwise so as to separate overload switch contacts 37 and 53 thus stopping the motor. Upon stopping of the motor, if the blades are frozen, spring 35 will return the motor shaft and armature to their original positions and re-close switch contacts 37 and 53. This provides for a striking action of the blade against the detaining material, which may assist in clearing such material. In any case, contacts 37 and 53 will re-close and remain closed when the abnormal resistance is removed.

During each cycle of worm gear 24, actuator pin 44 will drop into recess 45 and permit strip 40 to push pin 48 inwardly so as to open parking contacts 56 and 57. However, as long as the parking button connects either of contacts 60 or 61 to the battery, the motor will continue operating normally, irrespective of the condition of the parking contacts. However, when the parking button is moved away from contacts 60 and 61, as in Fig. 2, battery current is led through parking contacts 56 and 57 to low speed connection 64 so that upon the next opening of these contacts, the motor will stop. This occurs at the point when the blades are at the bottom of the windshield so as to be out of the range of vision of the operator.

The overload control may be used with other forms of parking controls and, vice versa. Moreover, the mechanical arrangement of these controls is not essential and may be modified in various respects as will occur to those skilled in the art. The exclusive use of all modifications as come within the scope of the appended claims is contemplated.

I claim:

1. In a windshield wiper drive transmission, meshing driving and driven gears, one mounted for bodily displacement from an operative position when subjected to an overload and having an abutment, a spring pressed lever engaging said abutment and normally maintaining said movable gear in said operative position, and a wiper control carried by said lever for stopping the drive transmission to the wiper upon overloading, said spring pressed lever being adapted automatically to restore said drive transmission and control for wiper operation following overload stoppage of the drive transmission.

2. A windshield wiper comprising an electric motor, a plurality of control switches therefor, transmission means, an element actuable responsive to subjecting of said transmission to an overload to open one of said switches and stop the motor, and a second element automatically actuable when said transmission reaches a predetermined position to open another of said switches and stop said motor for parking.

3. In a windshield wiper, an electric motor, a cyclically moving transmission, electrical motor connections including a main connection and branches leading to said motor, a parking switch in one of said branches, an element automatically actuable when said transmission reaches a predetermined position to open said switch and stop the motor, a manual switch for controlling the supply of current selectively to said branches for continuous running or parking, and an overload switch in said main connection automatically actuable when said transmission is subjected to overload to stop the motor irrespective of the positioning of said manual switch.

4. A windshield wiper comprising an electric motor, a transmission including an element bodily movable when the transmission is subjected to an overload and a second element cyclically movable during normal operation, a switch housing adjacent said motor, and a pair of switches in said housing, one of said switches having a control arm, actuable by said first transmission element upon an overload to stop the motor and the other switch having a contact arm actuable by said second transmission element when said transmission reaches a predetermined position to stop the motor for parking.

5. In a windshield wiper, an electric motor with an armature mounted for slight axial movement bodily, a worm on the motor shaft, a worm gear therefor for connection to the wiper arm, a pivoted lever bearing on the end of said shaft, a spring urging said lever in the direction resiliently to maintain said worm in normal meshing engagement with said gear, an electrical supply lead connected to said lever, a second lead connected to said motor, and a switch in said lead including a contact carried by said lever whereby upon shifting of said worm and armature, due to stopping of said gear, as the result of an overload, said switch is opened and the motor stopped, said spring acting automatically through said lever upon overload stoppage of the motor, to effect closure of said switch and return of said worm to normal meshing engagement with said gear.

6. In a windshield wiper, a motor and transmission including driving and driven members, one of said members being mounted for relative displacement as the result of overload, motor control means including a part operatively associated with said displaceable member for stopping said motor upon displacement thereof, and resilient means normally conditioning said control part for motor operation whereby operation of said motor and the wiper is restored immediately after overload stoppage.

IRVEN E. COFFEY.

REFERENCES CITED

The following references are of record in the file of this patent:

UNITED STATES PATENTS

| Number | Name | Date |
| --- | --- | --- |
| 1,218,236 | Backsheider | Mar. 6, 1917 |
| 2,086,030 | Hodgson et al. | July 6, 1937 |
| 2,259,790 | Auten | Oct. 21, 1941 |
| 2,335,424 | Korte et al. | Nov. 30, 1943 |